(12) United States Patent
Yoakum

(10) Patent No.: US 6,441,741 B1
(45) Date of Patent: Aug. 27, 2002

(54) OVERMOLDED TRANSPONDER

(75) Inventor: Jay Yoakum, Norco, CA (US)

(73) Assignee: Avid Identification Systems, Inc., Norco, CA (US)

( * ) Notice: Subject to any disclaimer, the term of this patent is extended or adjusted under 35 U.S.C. 154(b) by 0 days.

(21) Appl. No.: 09/312,951

(22) Filed: May 17, 1999

(51) Int. Cl.[7] .............................................. G08B 13/14
(52) U.S. Cl. .............................. 340/572.8; 340/572.5; 524/423
(58) Field of Search ............................ 340/572.8, 572.5; 428/480; 525/64; 401/263; 524/423, 436

(56) References Cited

U.S. PATENT DOCUMENTS

| | | | |
|---|---|---|---|
| 3,577,136 A | * 5/1971 | Wolf ........................ | 340/572.8 |
| 4,262,632 A | 4/1981 | Hanton | |
| 5,025,550 A | 6/1991 | Zirbes et al. | |
| 5,147,657 A | * 9/1992 | Giza ........................ | 425/117 |
| 5,149,734 A | * 9/1992 | Fisher et al. ................ | 524/423 |
| 5,211,129 A | 5/1993 | Taylor et al. | |
| 5,223,851 A | 6/1993 | Hadden et al. | |
| 5,256,047 A | * 10/1993 | Moldovanyi ................ | 425/130 |
| 5,281,855 A | 1/1994 | Hadden et al. | |
| 5,322,697 A | 6/1994 | Meyer | |
| 5,482,008 A | 1/1996 | Stafford et al. | |
| 5,502,095 A | * 3/1996 | Ueshima et al. ............. | 524/269 |
| 5,609,962 A | * 3/1997 | Ouhadi ........................ | 428/480 |
| 5,643,620 A | * 7/1997 | Brun, Jr. ..................... | 425/556 |
| 5,727,892 A | * 3/1998 | Baudin ........................ | 401/263 |
| 5,731,380 A | * 3/1998 | Golder ........................ | 525/64 |
| 5,751,256 A | * 5/1998 | McDonough et al. ....... | 340/572 |
| 5,847,650 A | * 12/1998 | Zhou et al. ............... | 340/572.6 |
| 5,859,587 A | * 1/1999 | Alicot et al. ............. | 340/572.8 |
| 5,986,562 A | * 11/1999 | Nikolich ................... | 340/572.8 |
| 6,071,446 A | * 6/2000 | O'Brien et al. ............ | 264/46.5 |

* cited by examiner

Primary Examiner—John Tweel
(74) Attorney, Agent, or Firm—Squire, Sanders & Dempsey LLP; David B. Abel

(57) ABSTRACT

A method of fabricating, a composition and overmolded components fabricated by the method and with the composition such as an overmolded transponder circuitry for a radio frequency identification device.

24 Claims, 6 Drawing Sheets

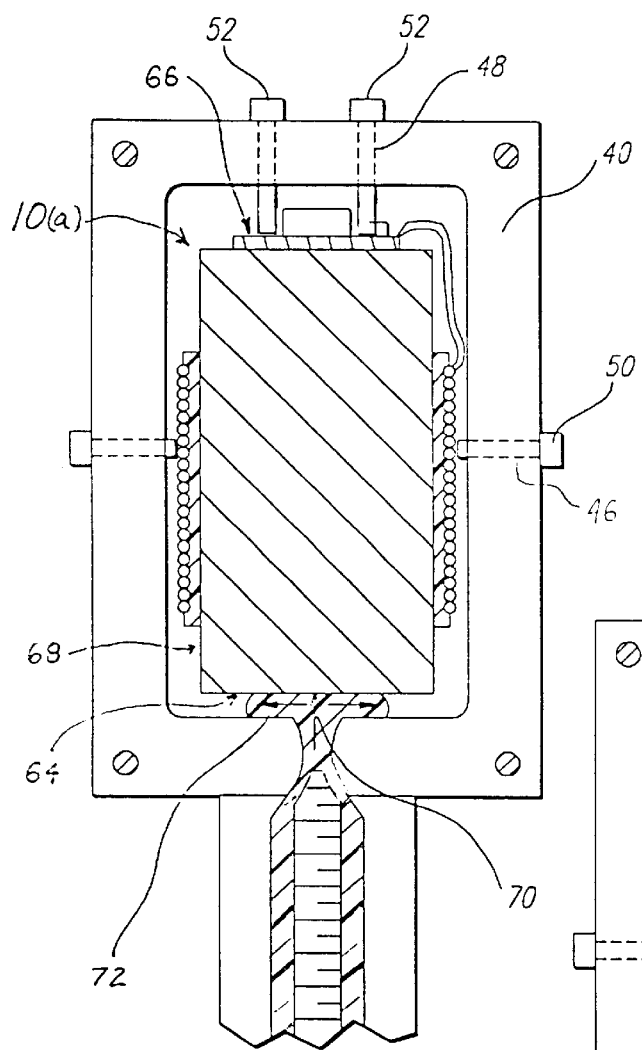
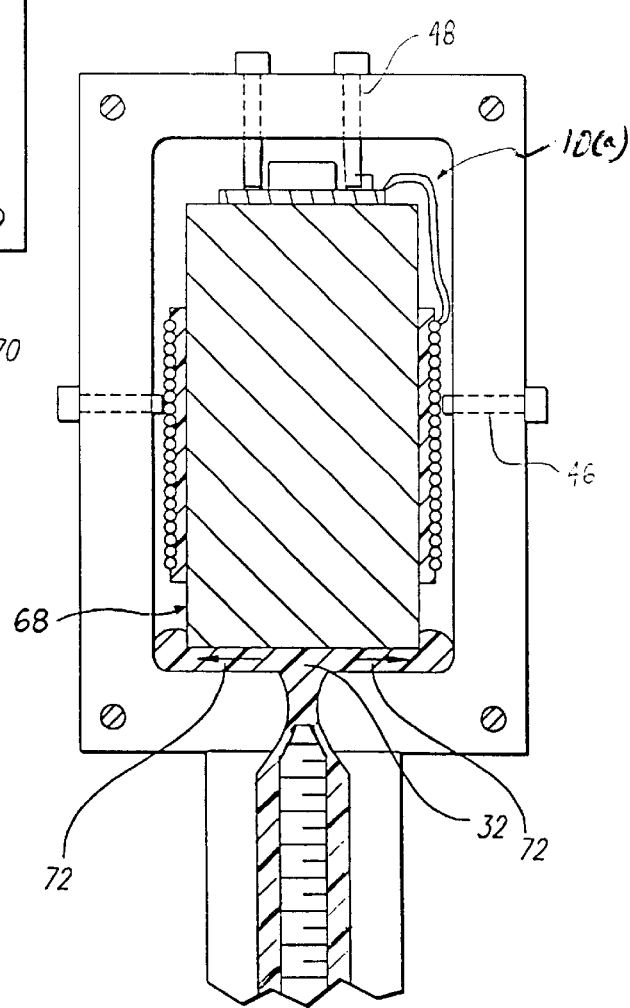

OVERMOLDED TRANSPONDER

FIELD OF THE INVENTION

The present invention generally relates to products and materials in the field of over-molding devices having ferrite cores, powdered metal cores and high energy product magnet cores, and more particularly to the materials and products made by overmolding electronic components incorporating such core materials. The invention has particular applications in the field of electronic identification ("EID") or radio frequency identification ("RFID") components and devices manufactured by the overmolding process.

BACKGROUND OF THE INVENTION

Ferrite cores, powdered metal cores and high energy product magnets such as samarium cobalt and neodymium-iron-boron magnets have certain advantageous magnetic and electric field properties making them ideal for use in certain types of electronic components and circuitry. These types of materials are frangible, yet the materials can be fabricated into a variety of shapes and generally exhibit good mechanical characteristics under compression loads. However, these frangible materials are generally weak in tensile strength, tending to crack or fracture when subject to relatively modest tensile loading, binding loads or impact loading. Cracks and fractures within the fabricated frangible materials can substantially decrease the beneficial magnetic and electric field properties, negatively impacting their desirable characteristics. Thus, maximum utilization of these types of frangible materials requires consideration of, and accommodation for, their limiting physical properties.

An exemplary application which can benefit from the use of a ferrite core as part of an electronic circuit is an Electronic Identification ("EID") or Radio Frequency Identification ("RFID") transponder circuit used in EID or RFID systems. EID and RFID systems generally include a signal emitter or "reader" which is capable of emitting a high frequency signal in the kilohertz (kHz) frequency band range or an ultra-high frequency signal in the megahertz (MHz) frequency band range. The emitted signal from the reader is received by a "transponder" which is activated in some manner upon detection or receipt of the signal from the reader. In EID and RFID systems, the transponder generates a signal or inductively couples to the reader to allow the reader to obtain identification codes or data from a memory in the transponder.

Generally, the transponder of an EID or RFID system will include signal processing circuitry which is attached to an antenna, such as a coil. For certain applications, the coil may be wrapped about a ferrite, powdered metal, or magnetic core. The signal processing circuitry can include a number of different operational components including integrated circuits, as known in the art, and many if not all of the operational components can be fabricated in a single integrated circuit which is the principal component of the signal processing circuitry of EID and RFID devices.

For example, certain types of "active" RFID transponders may include a power source such as a battery which may also be attached to the circuit board and the integrated circuit. The battery is used to power the signal processing circuit during operation of the transponder. Other types of transponders such as "Half Duplex" ("HDX") transponders include an element for receiving energy from the reader, such as a coil, and elements for converting and storing the energy, for example a transformer/capacitor circuit. In an HDX system, the emitted signal generated by the reader is cycled on and off, inductively coupling to the coil when in the emitting cycle to charge the capacitor. When the emitted signal from the reader stops, the capacitor discharges to the circuitry of the transponder to power the transponder which then can emit or generate a signal which is received by the reader.

A "Full Duplex" ("FDX") system, by comparison, includes a transponder which generally does not include either a battery or an element for storing energy. Instead, in an FDX transponder, the energy in the field emitted by the reader is inductively coupled into the antenna or coil of the transponder and passed through a rectifier to obtain power to drive the signal processing circuitry of the transponder and generate a response to the reader concurrently with the emission of the emitted signal from the reader.

Notably, many different circuit designs for active, HDX and FDX transponders are known in the art and have been described in a number of issued patents, and therefore they are not described in greater detail herein. Many of the types of EID and RFID transponders presently in use have particular benefits resulting from their ability to be imbedded or implanted within an object to be identified in a manner whereby they are hidden from visual inspection or detection. For such applications, the entire transponder may preferably be encased in a sealed member, for example to allow implantation into biological items to be identified, or to allow use in submerged, corrosive or abusive environments. Accordingly, various references, including U.S. Pat. Nos. 4,262,632; 5,025,550; 5,211,129; 5,223,851, 5,281,855 and 5,482,008, disclose completely encapsulating the circuitry of various transponders within a ceramic, glass or metallic container.

For an encapsulated transponder, it is generally the practice to assemble the transponder circuitry and then insert the circuitry into the glass, ceramic or metallic cylinder, one end of which is already sealed. The open end of a glass-type cylinder is generally melted closed using a flame, to create a hermetically sealed capsule. Other types of glass, ceramic or metallic containers utilize a cap to seal the open end, with the cap glued or mechanically connected to the open ended cylinder, as discussed for example in U.S. Pat. No. 5,482,008. Furthermore, as discussed in the aforementioned patent, to prevent the transponder circuitry from moving around inside of the capsule, it is also known to use an epoxy material to bond the circuitry of the transponder to the interior surface of the capsule.

As shown for example in U.S. Pat. No. 4,262,632 (hereby incorporated by reference), the potential advantages of utilizing EID and RFID devices in biological applications, such as the identification of livestock, have been under investigation for several years. As discussed in the U.S. Pat. No. 4,262,632, studies show that an EID "bolus" transponder suitable for placement in the reticulum of a ruminant animal will remain in the reticulum for an indefinite time if the specific gravity of the bolus transponder is two or greater, and/or the total weight of the bolus transponder exceeds sixty grams. Accordingly, for such applications, the bolus transponder generally requires a weight element as the EID circuitry can generally be very small and lightweight, requiring merely the integrated circuit and antenna and few other components. It has therefore been disclosed, for example in the U.S. Pat. No. 4,262,632 to incorporate a ferrite weight element within an encapsulant which also contains an EID transponder.

The design of a bolus transponder suitable for use in a ruminant animal may be also benefit from the appropriate use of a magnet or a ferrite core to enhance the signal transmission characteristics of the transponder while also providing the necessary weight to maintain the specific gravity of the bolus transponder at two or greater, and/or to have the total weight of the bolus transponder exceed sixty grams. In order to obtain widespread acceptance and use of the EID bolus transponder devices for ruminant animals, however, the devices must also be designed and fabricated with an understanding of the physical and economic requirements of the livestock application. Thus, while ceramic encapsulated bolus transponders suited to the reticulum environment are being investigated, the cost and fragile physical characteristics of the ceramics impact their commercial acceptance. Thus, an encapsulant for fabricating the capsule or casing for EID transponders which does not have the limitations of ceramic, glass or metallic encapsulants, particularly for bolus transponders, would be highly beneficial.

SUMMARY OF THE INVENTION

The present invention contemplates a method and apparatus for overmolding ferrite, powdered metal and magnet core materials and associated circuitry, for example circuitry for an EID or RFID transponder, whereby the encapsulant is a plastic, polymer or elastomer or other injection molded material compatible with the intended application environment. According to the invention, the encapsulant material applied in an injection molding or extrusion molding process to overmold the core and electronic circuitry of the transponder.

BRIEF DESCRIPTION OF THE DRAWINGS

FIG. 4 depicts a cross-sectional view through the mold tooling of FIG. 3 during the initial stage of the injection of molding material into the mold tooling;

FIG. 5 depicts a second cross-sectional view of the mold tooling of FIG. 3 showing a later stage in the molding process;

DETAILED DESCRIPTION OF THE PREFERRED EMBODIMENT

Figure 1:
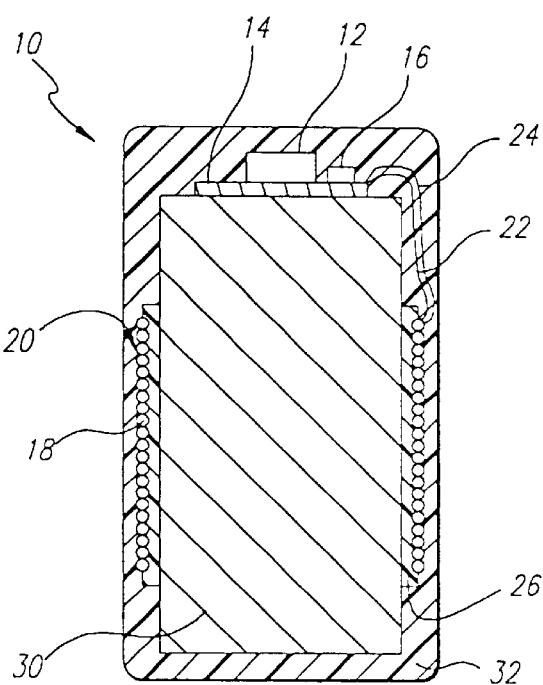
FIG. 1 is a cross-sectional side view of a transponder including an overmolded core fabricated according to the present invention.
Figure 2:
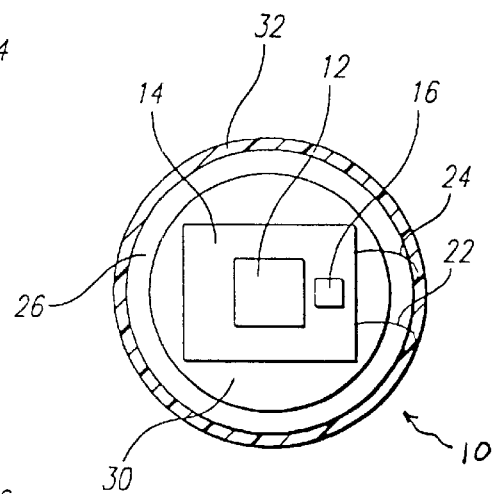
FIG. 2 is a cross-sectional view of the transponder of FIG. 1.

FIG. 1 depicts a cross-sectional side view of a transponder 10 made according to the present invention. FIG. 2 depicts an end view of the transponder 10 of FIG. 1. The transponder 10 includes signal processing circuitry such as an integrated circuit 12 mounted on a circuit board 14 together with other circuit elements such as a capacitor 16. The signal processing circuitry may be an active, Half Duplex (HDX) or Full Duplex (FDX) transponder circuit.

The integrated circuit 12 and capacitor 16 are affixed to the circuit board 14 and electrically coupled to a wire 18 formed into a coil 20, at the leads or ends 22 and 24 of the wire 18. In the embodiment illustrated in FIGS. 1 and 2, the coil 20 is wrapped about a bobbin 26 and then positioned over a core 30, with the circuit board 14 affixed to an end of the core 30 to form a transponder assembly 10a. As discussed below, the transponder assembly 10a may preferably be over-molded within an injection molding material 32, which may be a plastic, polymeric or epoxy material to form the completed transponder 10.

The relative axial location of the coil 20 about the core 30 may be important to the optimal operation of the transponder 10. Specifically, the transponder 10 preferably includes a tuned coil 20 and capacitor 16 combination. Generally, in a transponder, tuning is accomplished by matching the length of the wire 18 forming coil 20 to the capacitance of capacitor 16. However, when the wire 18 has to be wrapped around the bobbin 26 and installed over the core 30, the exact length of wire 18, as well as its inductance, cannot be as advantageously controlled during design and fabrication so as to allow matching of the inductance of the coil 20 to the capacitance of the capacitor 16 in order to tune the circuit of the transponder 10. It should be appreciated that if the transponder is not properly tuned, the reading and data transfer capabilities of the transponder may be diminished.

It has been found, however, that by the proper axial placement of the core 30 within the coil 20, the transponder 10 can be tuned even without optimizing the length of the wire 18, as the inductance of the coil 20 changes due to the axial positioning of the ferrite core 30. For a given set of design parameters for a ferrite core 30 and coil 20 combination, including the core's circumference and length as well as the length of the wire 18 and the capacitance of the capacitor 16, a tuned transponder assembly 10a can be fabricated by moving the coil 20 axially along the long axis of the ferrite core 30 until a tuned inductor/capacitor system is established and then securing the bobbin 26 with coil 20 to the ferrite core 30 during the manufacturing process.

Figure 3:
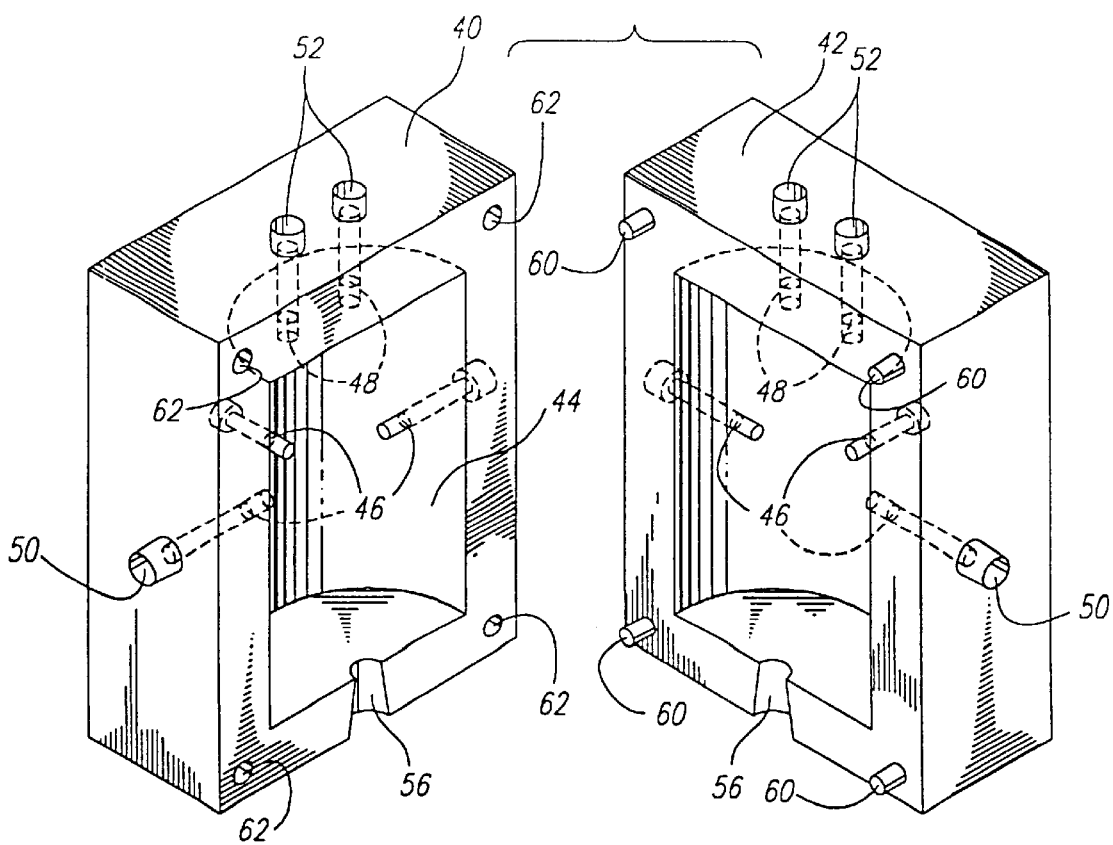
FIG. 3 depicts a perspective view of the mold tooling utilized for the overmolding process to fabricate the transponder of FIG. 1.

Following assembly of the circuitry of the transponder assembly 10a, the transponder assembly 10a is transferred to an injection molding machine, Specifically, the transponder assembly 10a is placed within the mold tooling 40, 42 illustrated in FIGS. 3–7. FIG. 3 depicts a perspective view of the mold tooling 40, 42 without the transponder assembly 10a installed therein. The mold tooling 40, 42, when closed, defines a cavity 44 sized to receive the transponder 10a in preparation for over-molding with the plastic, polymeric or epoxy injection molding material 32. It should be noted, however, that while depicted as cylindrical, the interior walls of the mold tooling 40, 42 can have surface features to define a variety of shapes or patterns on the outer surface of the completed transponder 10, as may be beneficial to particular applications. The potential variations for the design of the exterior shape of the completed transponder, thus, for example, may be cylindrical, bullet shaped, tapered at opposite ends or a flattened oval, and the outer walls may be smooth, rough or bumpy, depending on the intended application.

As depicted in FIG. 3, the mold tooling 40, 42 includes inwardly projecting pins 46, 48 which serve to position and secure the transponder assembly 10a within the tooling 40, 42 during the injection process. The pins 46, 48 are configured to be retracted by pressure response pin retractors 50, 52 into the mold tooling 40, 42 near the end of the injection cycle. At one end of the mold tooling 40, 42 is a sprue 56 through which the injection molding material 32 is injected by an injection molding machine (not shown). As also shown in the perspective view of FIG. 3, the mold tooling 40, 42 may include guide pins 60 on tooling 42 which align with and engage guide pin receiving holes 62 on tooling 40 when the mold tooling is closed, to maintain the alignment of the mold tooling 40, 42 during the injection cycle.

FIGS. 4–7 depict cross-sectional views of the mold tooling 40, 42, and a transponder assembly 10a positioned therein, illustrating in sequential the advance of the plasticized molding material 32 during the injection molding process. As depicted, the pins 46, 48 act to co-axially position and center the transponder assembly 10a within the mold cavity 44. When the heated and plasticized molding material 32 is injected under pressure by the injection molding machine, the plasticized molding material 32 flows in through the sprue 56 and impinges upon the end 64 of the core 30 as shown by arrow 70, and axially compresses the core 30 against pins 48 which are positioned to contact the opposite end 66 of the transponder assembly 10a.

The molding material 32 then flows radially outward along the end 64 of the ferrite core 30 as depicted by arrows 72 in FIGS. 4 and 5. When enough molding material 32 has been injected to fill up the end of the cavity 44, the advancing face of the molding material 32 proceeds longitudinally along the radially outer surface 68 of the transponder assembly 10a, as shown by arrows 74 in FIG. 6. This over-molding injection process only subjects the core 30 to compressive loads, and does not subject the core 30 to tensile loading at any time during the entire injection cycle. Thus, by the over-molding injection process of the present invention the core 30 will not be damaged in a manner which would diminish the electrical or magnetic properties of the core.

Figure 7:
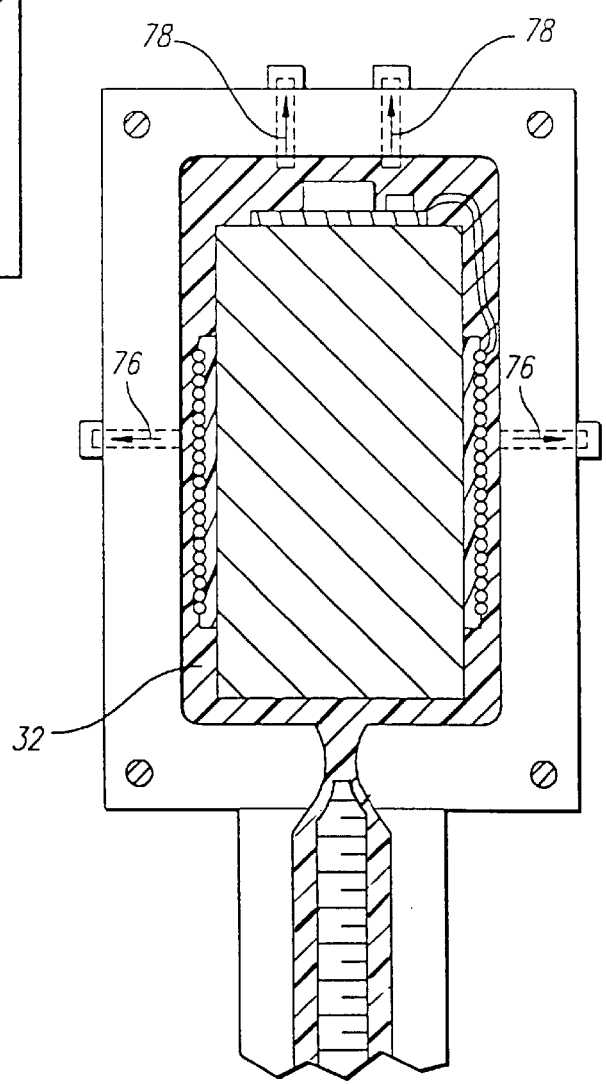
FIG. 7 depicts another cross-sectional view of the tooling of FIG. 3 showing the molding process wherein the pins are being retracted into the tooling.

When the mold cavity 44 is completely filled with the plasticized molding material 32, the internal pressure within the cavity 44 increases. The pins 46, 48, which position the transponder assembly 10a within the cavity 44, are connected to pin retractors 50, 52, which are pressure sensitive. When the pressure in the mold cavity reaches a predetermined level, the pins 46, 48 retract into the mold cavity wall as shown by arrows 76, 78, and the space vacated by the pins 46, 48 is filled by the molding material 32 as shown in FIG. 7. Since the molding material 32 has already encased the transponder 10, however, the molding material 32 will hold the transponder 10 in place during the curing or hardening stage of the injection over-molding cycle. Upon completion of the over-molding process, the mold tooling 40, 42 is opened and the completed transponder 10 is ejected.

Figure 8:
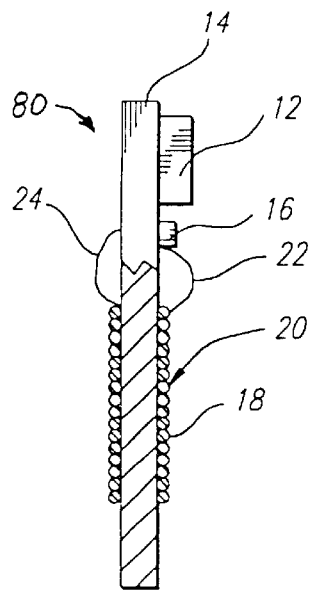
FIG. 8 depicts a side view of an alternative configuration for a transponder which has not yet been coated with molding material.
Figure 9:
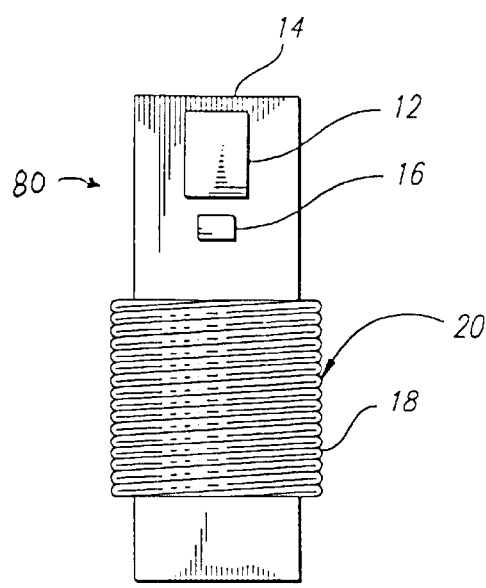
FIG. 9 depicts the front view of the transponder of FIG. 8.

FIGS. 8 and 9 depict a side view and a front view, respectively, of an alternative embodiment of a transponder 80 which does not include the core 30 of the transponder 10 of FIG. 1. Instead, for the transponder 80, the wire 18 forming the coil 20 is wrapped about the circuitboard 14 upon which the integrated circuit 12 and capacitor 16 are mounted. The coil 20 is interconnected to the circuitboard 14 and the integrated circuit 12 thereon, via leads 22 and 24 generally as discussed above with respect to FIG. 1. The transponder 80 of FIGS. 8 and 9 is generally much smaller than the assembly of FIG. 1, in that it particularly does not include the core 30 and the added weight and size attendant to the use of the core 30 as depicted in FIG. 1. The transponder 80 of FIGS. 8 and 9, however, can also be over-molded in a process similar to the process described with respect to FIGS. 4–7.

Figure 6:
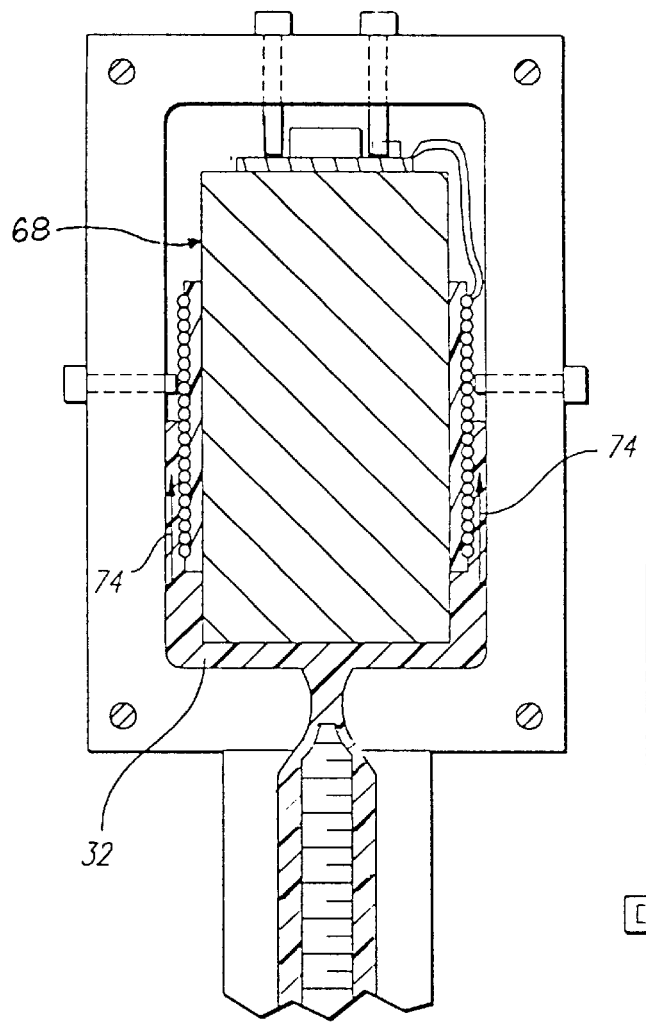
FIG. 6 depicts another cross-sectional view of the tooling of FIG. 3 showing a further stage in the molding process.
Figure 10:
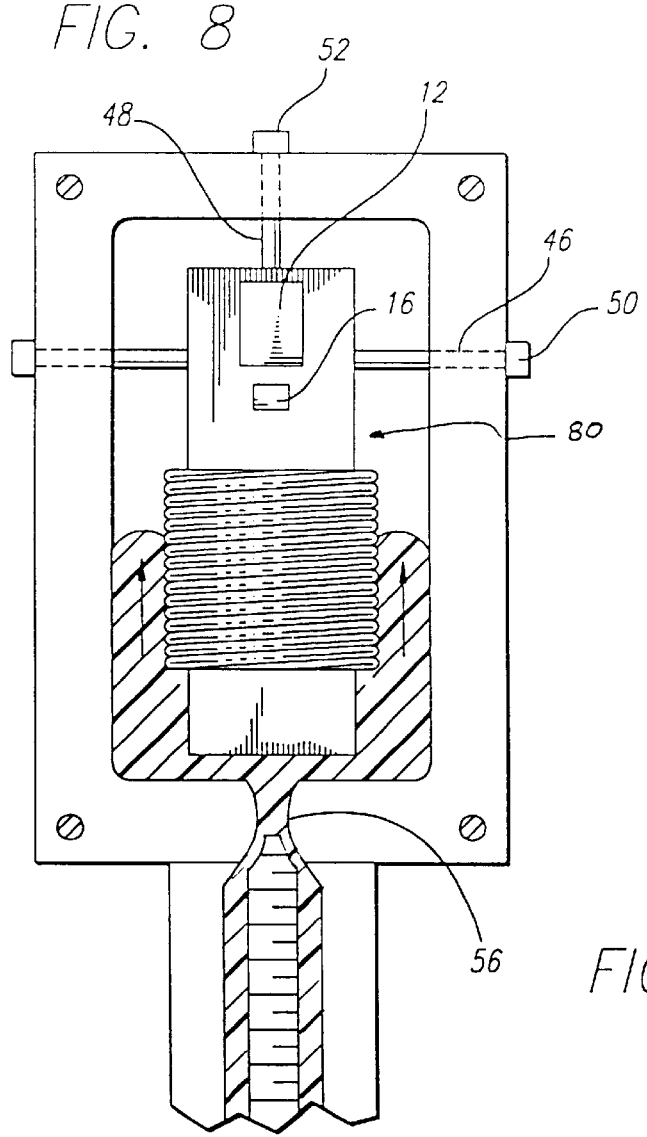
FIG. 10 depicts the transponder of FIGS. 8 and 9 placed within the mold tooling of FIG. 3 during the injection molding process at the same stage as depicted in FIG. 6.

To briefly illustrate this process, the transponder 80 is depicted within the assembled mold tooling as shown in FIG. 10, which is comparable to mold tooling 40 and 42 discussed above with respect to FIGS. 3–7. In the illustration of FIG. 10, the injection of the plastisized molding material 32 has progressed to essentially the same stage as shown in FIG. 6, in that the advancing face of the molding material 32 is proceeding longitudinally up the outer surface of the transponder 80 and the pins 46 and 48 are centrally positioning the transponder 80 within the mold tooling 40, 42. Again, the exterior configuration of the resulting over-molded transponder assembly 60 may be any desired shape which is limited only by the moldability of the shape. It should be noted that transponder 80 may be encased in glass prior to the overmolding process, however, the glass capsule is not shown.

Figure 11:
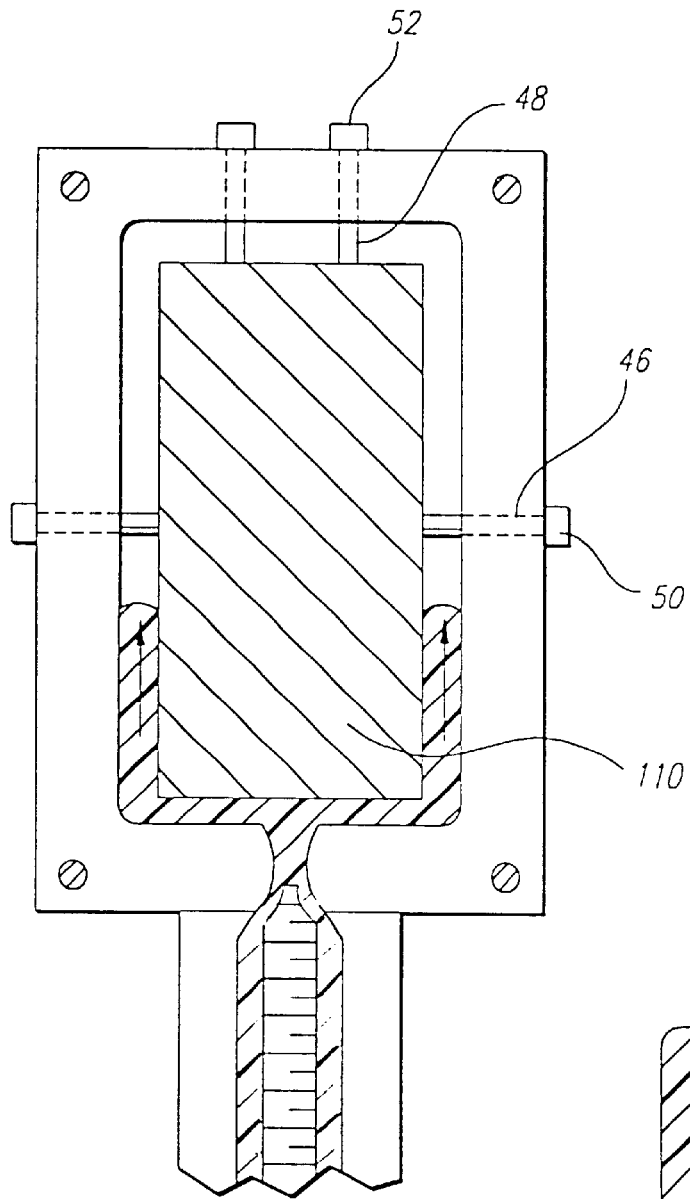
FIG. 11 depicts a frangible core element placed within the tooling of FIG. 3 during the overmolding injection process at the same stage as the step depicted in FIG. 6.
Figure 12:
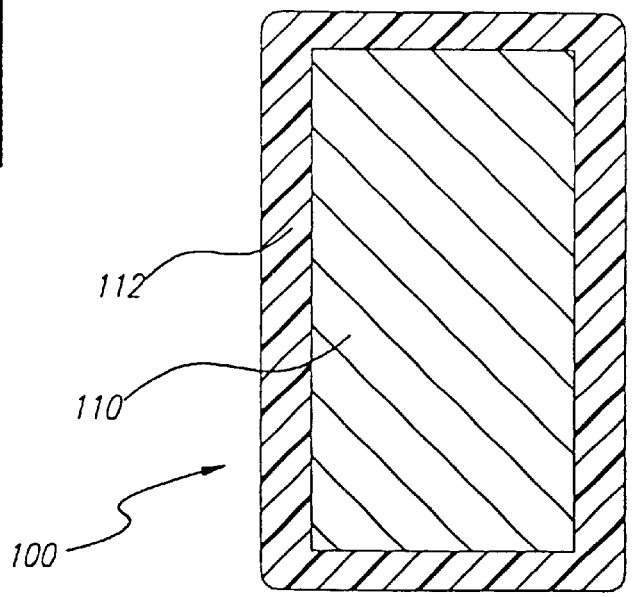
FIG. 12 depicts a cross sectional view of a frangible core overmolded with an overmolding material according to the process of the present invention.

FIG. 11 illustrates another application for the overmolding process according to the present invention in which a frangible core 110 is placed within the mold tooling 40 and 42 of FIG. 3 and positioned by pins 46 and 48 during the over-molding process. The over-molding process proceeds generally in the same manner as discussed above with respect to FIGS. 4–7. FIG. 11 thus illustrates the stage generally corresponding to FIG. 6, wherein the advancing face of the plasticized molding material 32 is proceeding longitudinally along the outer radial surface of the frangible core 110. Following completion of the over-molding process, the encapsulated frangible core 110 is ejected from the mold tooling. The completed assembly 100, as shown in the cross-sectional view of FIG. 12, is a frangible core 110 encased within an overmolding material 112. In this embodiment, the frangible core may be formed from ferrite, powdered metals or high energy product magnets such as samarium cobalt and neodymium-iron-boron materials.

Figure 13:
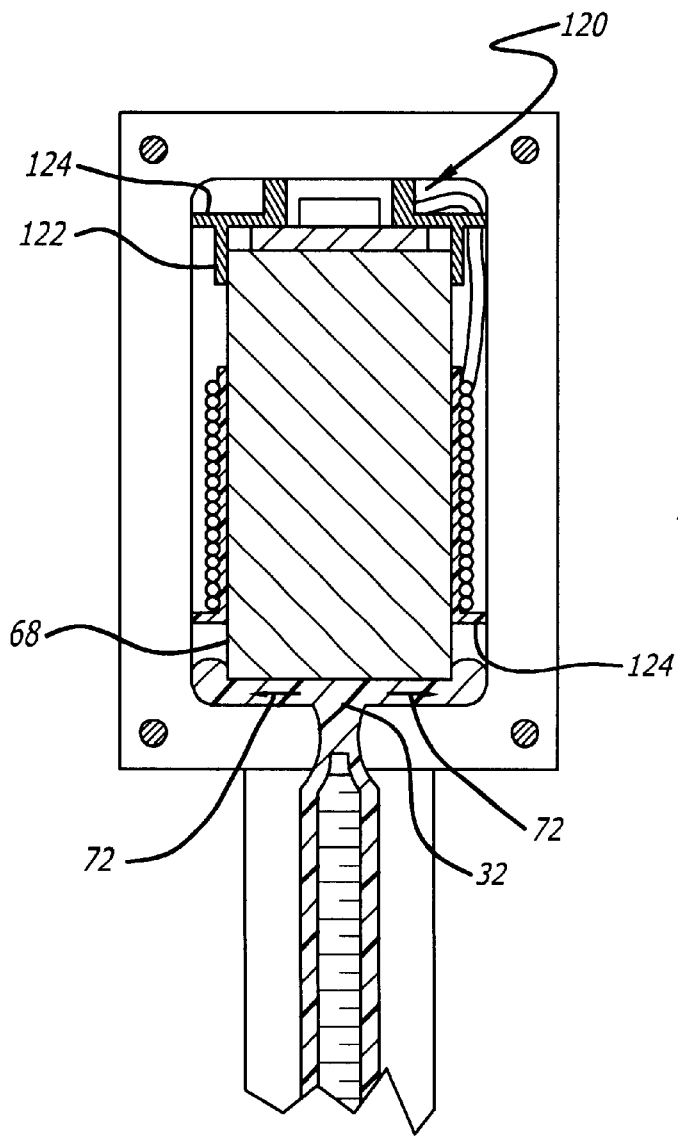
FIG. 13 depicts a perspective view of a transponder within an alternative design for the mold tooling, and positioned therein by one or more centering elements during the overmolding process.

FIG. 13 depicts a cross-sectional view of a transponder within an alternative design for the mold tooling, and positioned therein by one or more centering elements 120 during the overmolding process to fabricate the transponder like that of FIG. 1. The centering elements 120 are designed with a center portion such as a sleeve 122, designed to fit around the core 30. The centering elements 120 may also include radially outwardly projecting fins or pins 124, which will center the transponder within the tooling during the overmolding process, and thereby eliminate the need for the retractable pins illustrated and described above.

The over-molding process of the present invention encapsulates the frangible core 110 in a protective shell, which allows the frangible core materials to be used in applications which the frangible physical property of such materials would not otherwise allow. For example, samarium cobalt and neodymium-iron-boron magnets encased in a relatively thin coating of plastic or polymeric materials by the over-molding process could be used in objects subject to shock, impact or vibrational loads which would otherwise lead to the cracking, fracturing or other physical and magnetic degradation of the magnetic core.

Figure 14:
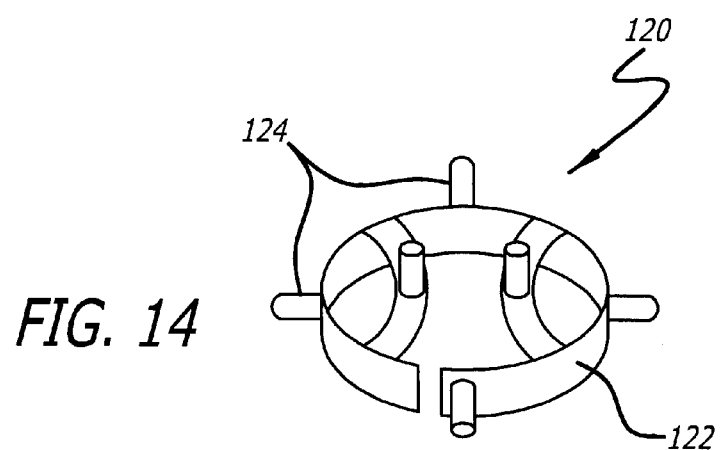
FIG. 14 depicts a perspective view of a centering element as shown in FIG. 13.

FIG. 14 depicts a perspective view of the centering element 120, showing the sleeve 122 and the radial projecting fins or pins 124. The centering element 120 may be formed from plastic, or from the same type of material used to overmold the transponder. It is also contemplated that the centering element may simply be a part of, or connected, to the bobbin 26 of FIG. 1, wherein the pins 124 simply extend radially outward from one end or both ends of the bobbin.

The material selected for over-molding of the transponder assembly 10a, transponder 10 or frangible core 110, depends in part upon the specific application for the completed component. Various types of thermoplastic materials are available for injection molding such components. As used herein, thermoplastic is to be construed broadly, including for example linear polymers and straight-chain or branch-chained macromolecules that soften or plasticize when exposed to heat and return to a hardened state when cooled to ambient temperatures. The term polymer is to be understood broadly as including any type of polymer such as random polymers, block polymers, and graft polymers.

A large number of thermoplastic polymeric materials are contemplated as being useful in the overmolding of transponders and frangible cores of the present invention. The thermoplastic materials may be employed alone or in blends. Suitable thermoplastic materials include, but are not limited to, rubber modified polyolefins, mettallocene, polyether-ester block copolymers, polyether-amide block copolymers, thermoplastic based urethanes, copolymers of ethylene with butene and maleic anhydride, hydrogenated maleic anhydride, polyester polycaprolactone, polyester polyadipate, polytetramethylene glycol ether, thermoplastic elastomer, polypropylene, vinyl, chlorinated polyether, polybutylene terephalate, ploymethylpentene, silicone, polyvinyl chloride, thermoplastic polyurethane, polycarbonate, polyurethane, polyamide, polybutylene, polyethylene and blends thereof.

Preferred thermoplastic materials include rubber modified polyolefins, metallocenes, polyether-amide block copolymers and polyether-ester block copolymers. Preferred rubber modified polyolefins are commercially available under the tradenames of VISTAFLEX™ from Advanced Elastomer Systems Corporation, KRATON™ from Shell Corporation, HIFAX™ from Montell Corporation, X1019-28™ from M. A. Hanna, SARLINK™ from DSM Corporation, and SANTOPRENE™ from Advanced Elastomer Systems Corporation. Preferred metallocenes are available from Dow Corporation under the tradenames ENGAGE™ and AFFINITY™. Preferred polyether-amide block copolymers are available under the tradename PEBAX™ from EIG Auto-Chem. Preferred polyether-ester block copolymers are commercially available from DuPont under the tradename HYTREL™.

The thermoplastic overmolded casings of the present invention may also include a suitable filler or weighting material in order to adjust the properties of the finished casing and/or transponder. For example, the specific gravity or density of the overmolded casing may be adjusted by the addition of a suitable material, such as barium sulfate, zinc oxide, calcium carbonate, titanium dioxide, carbon black, kaolin, magnesium aluminum silicate, silica, iron oxide, glass spheres and wollastonite. The filler or weighting material may be present in an amount that will adjust the specific gravity of the overmolded casing and the resulting transponder. Thus, the weighting material may be added in a range from about 5 percent by weight to about 70 percent by weight. Additionally, the over-molding material for the casings of the present invention may also include a suitable plasticizer or other additives, in order to improve the processability and physical properties, such as the flow properties and ejectability of the over-molding material. The plasticizer may be present in an amount that will adjust the flow properties during the injection molding process as necessary for various applications.

Notably, for many of the foregoing types of injection molding materials, particularly those whose density is increased by the addition of a densifier, the material in its plasticized state for the injection process has a low viscosity. Thus, injection molding such materials requires high injection pressures in turn leading to high stress forces being imposed on the core materials during the injection process. For these reasons, minimizing or eliminating any loading other than compressive loading on the frangible cores during the injection process is highly preferred.

The over-molded casing of the present invention preferably have a wall thickness of between about 0.010 inches to over one inch, however, for most applications the wall thickness will preferable be less than 0.5 inches. Depending on the desired exterior shape of the completed assembly and the shape of the core, the wall thickness of the casing may be uniform or may vary significantly at various locations about the core.

For a bolus transponder 10 intended for use within ruminant animals, it is necessary to have specific physical properties for the over-molded casing material. Thus, the over-molded casing material must be able to withstand the acidic environment in the digestive tract of a ruminant animal, it must be impervious to the microbes and enzymes which are active within the digestive tract of the ruminant animal, and it should preferably have certain physical properties to allow ease in shipping and handling of the bolus transponder 10 prior to administration to the ruminant animal. In addition, it is preferable that the bolus transponder 10 have a specific gravity of at least 1.7 and preferably at least 2. Thus, it is generally desirable to use a weighting material to increase the bulk density or specific gravity of the over-molding material, so that the over-molding material has a specific gravity which assists in maintaining the specific gravity of the fabricated bolus transponder 10 in the desired range.

For a bolus transponder 10, therefore, it has been determined that a preferred combination of a thermoplastic polyester elastomer sold by DuPont under the trade name HYTREL 3078™, combined with barium sulfate as a densifier provides an acceptable combination for use as the over-molding material for a bolus, and, in appropriate ratios, provides an injection molding material with a specific gravity in the range of between 1.7 and 2. Such a material may be introduced by DuPont and available under the trade name HYTREL 8388.™

By way of providing a specific example, an acceptable over-molding material can be made from a blend of HYTREL 3078™, or a similar thermoplastic polyester elastomer (TPE), mixed with barium sulfate in a ratio of between about 20 to 90% TPE and 80% to 10% barium sulfate. This blend provides a suitable over-molding material to form the casing for the bolus transponder 10. Purified USP grade barium sulfate or barite fines are preferred as the densifying agents, as these materials have previously been blended with a carnauba wax and a medicant to form boluses for ruminant animals, as described for example, in U.S. Pat. No. 5,322,692 issued to American Cyanamid Company.

The advantages of the foregoing method for use in fabricating boluses have been found to be significant. First, eliminating the necessity of the ceramic encapsulate has resulted in a substantial reduction in material costs as compared to the costs of fabricating a ceramic encapsulated bolus. In addition, the fabrication costs, i.e. the costs of manufacturing the bolus separate and distinct from the component costs, are substantially decreased due to the efficiency and automation associated with the injection molding process. Accordingly, the overall costs savings over the equivalent costs of fabricating bolus transponder encased in a ceramic material may exceed 50%. While the ceramic encased boluses have been found to be relatively fragile such that they can be damaged if they are dropped or even rattled together during shipping, the boluses encased with the HYTREL 8388™—barium sulfate over-molding material has demonstrated physical characteristics which have eliminated these problems. In addition, the bolus transponder 10 of the present invention can be packaged in bulk with minimal packing material because vibrations during shipping between respective boluses does not cause breakage. Finally, the HYTREL 8388™; TPE-barium sulfate combination provides the physical characteristics required for utilization in the stomach of a ruminant animal. The blend is not effected by the acidic conditions, is neutral to the biologic fuana, microbes and enzymes, and it has a preferred specific gravity so as to maintain retention within the stomach of a ruminant animal.

For the transponder 80 of FIGS. 8–10 which is intended for implantation applications, it may be preferable to use a class 6 medical grade epoxy. Alternatively, the transponder 80 may be encased in a glass material by known methods, and then overmolded with the plastic or polymeric materials discussed herein to provide added strength, impact resistance and toughness, which properties are lacking in the glass encased transponders.

It will be appreciated by those skilled in the art that, upon review of the foregoing description of the present invention, other alternatives and variations of the present invention will become apparent. Accordingly, the scope of the protection afforded is to be limited only by the appended claims.

What is claimed is:

1. An overmolded transponder for an electronic identification system comprising:
   an antenna;
   a transponder circuit including signal processing circuitry electrically interconnected to said antenna;
   a core element on which said antenna and said transponder circuit are mounted; and
   an overmolded casing formed by placing said antenna, transponder circuit and core element within a cavity formed by mold tooling in an injection molding machine and injecting an overmolding material into said cavity so as to overmold and encase said core element, said transponder circuit and said antenna.

2. The transponder of claim 1 wherein said overmolded casing has a wall thickness of between about 0.010 inches to one inch.

3. The transponder of claim 1 wherein said overmolding material is selected from the group consisting of plastic, polymeric and epoxy materials.

4. The transponder of claim 1 wherein said overmolding material is a blend of a thermoplastic polyester elastomer (TPE) having properties comparable to that of the TPE sold under the brand name HYTREL 3078™ available from DuPont, mixed with barium sulfate in a ratio of between about 20 to 90% TPE and 80% to 10% barium sulfate.

5. The transponder of claim 1 wherein said overmolding material is a thermoplastic material selected from the group consisting of linear polymers and straight-chain and branch-chained macromolecules that soften or plasticize when exposed to heat and return to a hardened state when cooled.

6. The transponder of claim 1 wherein said overmolding material is a polymer selected from the group consisting of random polymers, block polymers, and graft polymers.

7. The transponder of claim 1 wherein said overmolding material is a thermoplastic material selected from the group consisting of rubber modified polyolefins, mettallocene, polyether-ester block copolymers, polyether-amide block copolymers, thermoplastic based urethanes, copolymers of ethylene with butene and maleic anhydride, hydrogenated maleic anhydride, polyester polycaprolactone, polyester polyadipate, polytetramethylene glycol ether, thermoplastic elastomer, polypropylene, vinyl, chlorinated polyether, polybutylene terephalate, ploymethylpentene, silicone, polyvinyl chloride, thermoplastic polyurethane, polycarbonate, polyurethane, polyamide, polybutylene, polyethylene and blends thereof.

8. The transponder of claim 1 wherein said overmolding material is a rubber modified polyolefin material selected from the group consisting of materials commercially available under the tradenames of VISTAFLEX™ from Advanced Elastomer Systems Corporation, KRATON™ from Shell Corporation, HIFAX™ from Montell Corporation, X1019-28™ from M. A. Hanna, SARLINK™ from DSM Corporation, and SANTOPRENE™ from Advanced Elastomer Systems Corporation.

9. The transponder of claim 1 wherein said overmolding material is a polyether-ester block copolymer commercially available from DuPont under the tradename HYTREL™.

10. The transponder of claim 3 wherein said overmolding material includes a weighting material selected from the group consisting of barium sulfate, zinc oxide, calcium carbonate, titanium dioxide, carbon black, kaolin, magnesium aluminum silicate, silica, iron oxide, glass spheres and wollastonite.

11. The transponder of claim 10 wherein the weighting material is present in an amount of between about 5 percent by weight to about 70 percent by weight.

12. The transponder of claim 10 wherein said overmolding material further includes a plasticizer in an amount sufficient to adjust the flow properties during the injection molding process.

13. The transponder of claim 1 wherein said overmolding material is a TPE blend sold under the tradename HYTREL 8388™ by DuPont.

14. The transponder of claim 1 wherein said overmolding material is a combination of:
   a thermoplastic material selected from at least one of the group consisting of rubber modified polyolefins, mettallocene, polyether-ester block copolymers, polyether-amide block copolymers, thermoplastic based urethanes, copolymers of ethylene with butene and maleic anhydride, hydrogenated maleic anhydride, polyester polycaprolactone, polyester polyadipate, polytetramethylene glycol ether, thermoplastic elastomer, polypropylene, vinyl, chlorinated polyether, polybutylene terephalate, ploymethylpentene, silicone, polyvinyl chloride, thermoplastic polyurethane, polycarbonate, polyurethane, polyamide, polybutylene and, polyethylene; and a weighting material selected from the group consisting of barium sulfate, zinc oxide, calcium carbonate, titanium dioxide, carbon black, kaolin, magnesium aluminum silicate, silica, iron oxide, glass spheres and wollastonite.

15. The transponder of claim 1 wherein said overmolding material is a thermoplastic polyester elastomer (TPE), mixed with barium sulfate in a ratio of between about 20 to 90% TPE and 80% to 10% barium sulfate to have a specific gravity in the range of between about 1.7 and 2.

16. The transponder of claim 1 wherein said core element is made of a frangible material forming a frangible core.

17. The transponder of claim 16 wherein said frangible core is formed from a material selected from the group consisting of ferrite, powdered metals and high energy product magnets such as samarium cobalt and neodymium-iron-boron materials.

18. A method of forming an overmolded transponder for an electronic identification system comprising:

providing a transponder circuit including signal processing circuitry electrically interconnected to an antenna;

mounting said antenna and said transponder circuit on a core element to form an assembly;

placing said transponder circuit and core element assembly within a cavity formed by mold tooling in an injection molding machine, and injecting an overmolding material into said cavity so as to overmold and encase said core element and said transponder circuit.

19. The method of claim 18, further comprising selecting said overmolding material from the group consisting of plastic, polymeric and epoxy materials.

20. The method of claim 18, further comprising blending a thermoplastic polyester elastomer (TPE) mixed with barium sulfate in a ratio of between about 20 to 90% TPE and 80% to 10% barium sulfate to form the overmolding material prior to the injection step.

21. The method of claim 18, further comprising selecting said overmolding material from the group consisting of linear polymers and straight-chain and branch-chained macromolecules that soften or plasticize when exposed to heat and return to a hardened state when cooled.

22. The method of claim 18, further comprising selecting said overmolding material from one or more of the group consisting of rubber modified polyolefins, mettallocene, polyether-ester block copolymers, polyether-amide block copolymers, thermoplastic based urethanes, copolymers of ethylene with butene and maleic anhydride, hydrogenated maleic anhydride, polyester polycaprolactone, polyester polyadipate, polytetramethylene glycol ether, thermoplastic elastomer, polypropylene, vinyl, chlorinated polyether, polybutylene terephalate, ploymethylpentene, silicone, polyvinyl chloride, thermoplastic polyurethane, polycarbonate, polyurethane, polyamide, polybutylene, and polyethylene.

23. The method of claim 18, further comprising plasticizing a polyether-ester block copolymer commercially available from DuPont under the tradename HYTREL™, and a barium sulfate weighting material to form the overmolding material.

24. The method of claim 18, further comprising blending into said overmolding material a weighting material selected from the group consisting of barium sulfate, zinc oxide, calcium carbonate, titanium dioxide, carbon black, kaolin, magnesium aluminum silicate, silica, iron oxide, glass spheres and wollastonite.

* * * * *

UNITED STATES PATENT AND TRADEMARK OFFICE
CERTIFICATE OF CORRECTION

PATENT NO. : 6,441,741 B1
DATED : August 27, 2002
INVENTOR(S) : Jay Yoakum

It is certified that error appears in the above-identified patent and that said Letters Patent is hereby corrected as shown below:

Column 9-10,
Lines 65 thru 3, are deleted from this patent.

Column 10,
Lines 34 thru 42, are deleted from this patent.
Lines 50-52, are deleted from this patent.

Column 12,
Lines 21-25, are deleted from this patent.

Signed and Sealed this

Twelfth Day of November, 2002

Attest:

Attesting Officer

JAMES E. ROGAN
Director of the United States Patent and Trademark Office